United States Patent [19]
Wilson

[11] 3,924,175
[45] Dec. 2, 1975

[54] D.C. SYSTEM FOR CONDUCTIVITY MEASUREMENTS

[75] Inventor: Homer M. Wilson, Houston, Tex.

[73] Assignee: Petrolite Corporation

[22] Filed: Feb. 28, 1974

[21] Appl. No.: 446,993

[52] U.S. Cl. .......................... 324/30 R; 204/195 R
[51] Int. Cl.² ........................................ G01N 27/42
[58] Field of Search .................. 324/30 R, 30 B, 71; 204/195 R, 195 C

[56] References Cited
UNITED STATES PATENTS

| | | | |
|---|---|---|---|
| 2,004,569 | 6/1935 | Davis, Jr. | 204/195 |
| 3,566,233 | 2/1971 | Kahn | 324/71 |
| 3,717,566 | 2/1973 | Wilson | 204/195 |

Primary Examiner—R. V. Rolinec
Assistant Examiner—Michael J. Tokar
Attorney, Agent, or Firm—Emil J. Bednar

[57] ABSTRACT

A d.c. system for measurement of conductivity of an electrolyte. Four side-by-side metallic electrodes serve as auxiliary electrodes for passing current through the electrolyte and reference electrodes for monitoring polarization potential increment. Conductors form separate electrical circuits with the electrodes. A current source passes a measurable amount of direct current between the auxiliary electrodes for inducing a change in polarization potential between the reference electrodes which incremental change in polarization potential is measured. A comparator controls the current source to provide the certain measurable amount of direct current. A readout device senses the direct current passed between the auxiliary electrodes, and the certain measurable amount of direct current is proportional to the conductivity of the electrolyte.

9 Claims, 2 Drawing Figures

D.C. SYSTEM FOR CONDUCTIVITY MEASUREMENTS

BACKGROUND OF THE INVENTION

1. Field of the Invention

This invention relates generally to the measurement of electrical conductivity of an electrolyte, and more particularly, it concerns an improved d.c. system for conductivity measurement.

2. Description of the Prior Art

The determination of the conductivity of an electrolyte such as an aqueous liquid has been an elusive task for over 100 years. A multitude of techniques and apparatuses were tested before relatively satisfactory systems were found for this purpose. The greatest error in prior attempts to measure electrolytic conductivity were caused by the polarization of electrodes which were employed for such purposes. Attempts to avoid the problem with the polarization of electrodes resulted in two separate electrical systems being developed for measurement of conductivity.

The polarization of electrodes can be eliminated by using alternating current of relatively high frequency and stability combined with very special electrodes coated with platinum black. These electrodes expose a large surface to an electrolyte so as to reduce the surface density of ions being deposited and thereby reducing the polarization effects.

The use of d.c. measurement system for determining conductivity has several advantages, the principal advantage being in avoiding a precisely settable and stable high frequency oscillator for generating the alternating currents of the preceding a.c. measurement system. Many attempts were made to employ d.c. currents for the measurement of conductivity of aqueous liquids and other electrolytes. Nearly 100 years ago, a method was developed in which the polarization effects of electrodes could be reduced to manageable proportions for producing reliable conductivity measurements. In such a method, a constant current is passed through the electrolyte and the drop in potential between two points in the system is measured by secondary electrodes connected to an electrometer.

The use of such a plurality of electrodes implements a novel technique of the present invention wherein current flow between a first set of electrodes creates a polarization potential between an additional set of potential monitoring electrodes. In such arrangement, the change in current can be correlated directly to the change of polarization potential at the reference electrodes. Thus, in linear systems such measurements can be correlated to the electromotive force which opposes the flow of current through the electrolyte. The problem of polarization at the electrodes can be overcome by applying a small finite current flow, and measuring the induced polarization potential change which is induced by this current flow. The original polarization potential at the measurement electrodes is eliminated in a linear system. Now, the measurement system follows Ohm's Law, in which the polarization potential about the measurement electrodes and the current flow inducing same are directly proportional.

In many of the known direct current measurement systems for determining conductivity of electrolytes, the measurement is made in what is termed an "open" cell. The electrodes are immersed within a liquid, but the system is exposed to atmospheric and other external forces which forces undesirably effect the current flow between the electrodes. Thus, movement of the electrodes relative to the container, the placement into the solution of some foreign material such as an air bubble, and stirring or like mechanical displacement, severely affected the accuracy of these d.c. measurements with electrodes in an open cell.

Complicated conductivity probe design may be employed with "closed" cells in which the conduction path for the electric current between a pair of electrodes is confined to a fixed volume of liquid within the completely enclosed nonconductive structure to avoid the external interference forces. However, such probe designs are substantially affected by liquids carrying solids which deposit within the confined areas of the probe. As the solids and other deleterious materials become entrapped in these complex probes, the calibration accuracy of the probes begin to vary, thereby effecting the conductivity measurement. Repeated standardizations and recalibrations or cleaning of the probe are required to maintain accurate measurements.

In the present novel technique, it has been found that the instrumentation which originated in the electrochemical process and apparatus, especially useful in measuring corrosion rates, as described in U.S. Pat. No. 3,406,101, may be employed for effecting d.c. conductivity measurements. In this patent, there is described a corrosion ratemeter which includes three electrodes adapted to be exposed to a corrodant, an adjustable current source, an ammeter, and a high impedance voltmeter as primary components. The adjustable current source applies a small current between a "test electrode" and an "auxiliary" or third electrode. At the same time, the voltmeter monitors the polarization potential between the test electrode and a reference electrode induced by the current flow. The current flow slightly polarizes the surface of the test electrode, and as a result, causes a shift in potential (polarization potential), between the test and reference electrodes. The current flow required to produce a certain desired polarization potential (usually about 10 millivolts) is directly proportional to the corrosion rate of the test electrode undergoing corrosion. Usually the polarization is selected within the linear voltage corrosion environmental conditions, and good results have been obtained with between 5 and 20 millivolts, but preferably 10 millivolts, polarization.

An improved electrochemical system especially for making such corrosion rate measurements is shown in U.S. Pat. No. 3,717,566. In this patent, there are illustrated automatic operating circuitry which passes a measurable amount of direct current (in reference to the drawing) between conductors A and T'. Simultaneously, polarization potential is sensed between conductors R and T. These conductors extend between a remotely located probe and the instrument circuitry. The current flow in conductors A and T' is adjusted so that there is a preselected polarization potential obtained between conductors R and T, usually in the nature of 10 millivolts. Comparator means control the passage of current so that the precisely desired polarization potential is obtained. A readout means senses the direct current passage between the conductors A and T' and provides a readout proportional to the corrosion rate. It should be pointed out at this time that electrode connections and arrangement for corrosion measurement are for observing the polarization of the test electrode while ignoring the voltage drop in the solution. The conductivity connections and arrangment are for measuring the voltage drop in the solution while ignoring the polarization of the current carrying electrodes.

The above automatic circuitry in U.S. Pat. No. 3,717,566 may be employed to great utility in the present invention. One outstanding advantage of the present invention is that known circuitry, as employed previously for the determination of corrosion measurements, can be employed in the novel technique herein described for the determination by d.c. technique of the conductivity of an electrolyte.

The present invention is a d.c. system for measurement of conductivity of an electrolyte which can employ well known circuitry with a four electrode novel probe system for effecting rapid and accurate measurements without hinderances previously suffered from solids, scaling or natural polarization potentials between reference electrodes.

SUMMARY OF THE INVENTION

In accordance with this invention, there is provided a d.c. system for measurement of conductivity of an electrolyte. The system comprises four metallic electrodes immersed in the electrolyte. These electrodes are disposed in a side-by-side alignment forming exterior and interior electrode pairs. Either the exterior or interior electrodes may serve as reference electrodes for monitoring polarization potentials, and respectively, either the interior or exterior electrodes may provide auxiliary electrodes for passing current through the electrolyte for creating the polarization potential. Conductors form separate electrical circuits with the electrodes. A current source passes a measurable amount of direct current between the auxiliary electrodes for inducing an incremental change of predetermined magnitude in polarization potential between the reference electrode. A potential measurement device connects to the reference electrode and measures the incremental change in polarization potential. A comparator associated with the potential measurement device controls the current source so that a certain measurable amount of direct current is passed between the auxiliary electrodes to induce the incremental change of predetermined magnitude in polarization potential between the reference electrodes. A readout device senses the direct current passed between the auxiliary electrodes so that the certain measurable amount of direct current is proportional to the conductivity of the electrolyte.

DESCRIPTION OF SPECIFIC EMBODIMENTS

Figure 1:
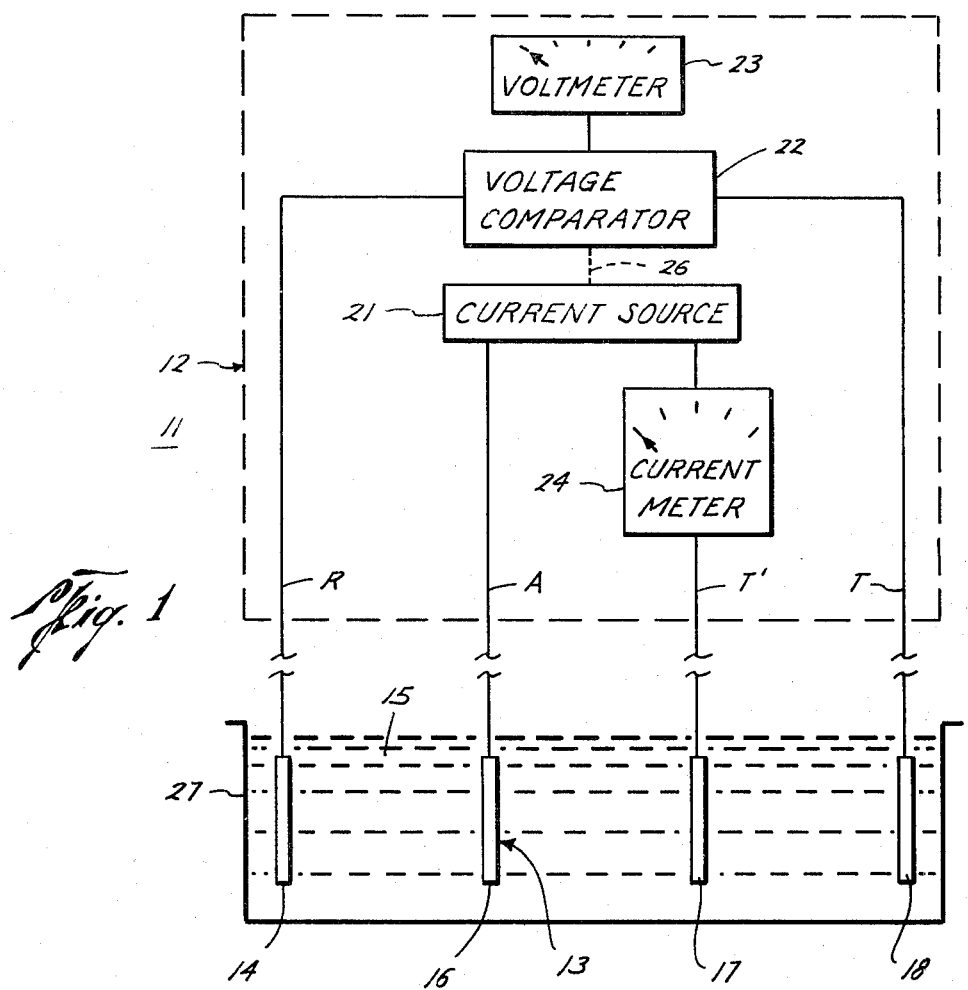
FIG. 1 is a schematic electrical circuit of a first embodiment of the present invention employing the components of the corrosion ratemeter described in U.S. Pat. No. 3,717,566 connected to four electrodes arranged according to the present novel technique.

The drawings show a preferred embodiment of the present d.c. measurement system for determination of conductivity of an electrolyte. Referring specifically to FIG. 1, the embodiment of the present d.c. system 11 includes elements forming instrumentation 12 employing components of the corrosion ratemeter described in U.S. Pat. No. 3,717,566 and other elements forming an electrode arrangement 13 adapted to be immersed in the electrolyte 15. The electrode arrangement 13 includes electrodes 14, 16, 17, and 18, which are arranged in a side-by-side alignment forming exterior and interior electrode pairs. Either the exterior or interior electrodes can serve as reference electrodes for monitoring the polarization potential within the cell 13, or respectively, the interior or exterior electrodes can provide auxiliary electrodes for passing current through the electrolyte 15 for creating the polarization potential between the reference electrodes. For best results, it is preferred that the exterior pair of electrodes 14 and 18 serve as reference electrodes and the interior pair of electrodes 16 and 17 provide the auxiliary electrodes.

For these purposes, the electrodes are connected by electrical conductors to the instrumentation 12. More particularly, the instrumentation 12 comprises a current source 21 and a potential measurement device or voltage comparator 22 which also includes a readout voltmeter 23. The voltmeter 23 indicates the initial or "freely corroding polarization potential" between the reference electrodes 14 and 18. Also, this readout device displays the incremental changes in the electrode potential resulting from current flow between the auxiliary electrodes 16 and 17. Connected in series with the current source 21 is an ammeter 24 providing a current readout. A feedback circuit 26 interconnects the voltage comparator 22 with the current source 21. As a result, operation of the current source 21 is controlled by the electrode potential incremental change detected within the voltage comparator 22. The conductor designations in FIG. 1 are the same as those employed in the description of the previously mentioned U.S. Pat. No. 3,717,566 concerning an automatic corrosion ratemeter.

More particularly, the voltage comparator 22 is connected by conductors R and T to the reference electrodes 14 and 18, respectively. The current source 21 is connected through the current meter 24 and conductors A and T' to auxiliary electrodes 16 and 17, respectively. The current source 21 passes a measurable amount of direct current between the auxiliary electrodes 16 and 17 through the electrolyte 15. The electrode potential incremental change produced upon reference electrodes 14 and 18 is detected in the voltage comparator 22. A current flow of small magnitude, for example, between several tenths of a microampere and several microamperes, produces a polarization potential incremental change between the reference electrodes of 5 to 50 millivolts.

The feedback circuit 26 between the voltage comparator 22 and current source 21 provides the following automatic function. The voltage comparator 22 controls the current source 21 until a certain magnitude of current is passed between the electrodes 16 and 17 to produce, for example, a 10 millivolt incremental change in electrode potential between the electrodes 14 and 18. Then, it maintains such current flow at a steady state value to hold such electrode potential change. It will be appreciated that the instrumentation 12 utilizes an electronic technique of d.c. admittance measurement which compensates for "free state polarization potential" between the reference electrodes 14 and 18. First, the voltage comparator 22 senses the polarization potential between the electrodes 14 and 18 without any current flow between the auxiliary electrodes 16 and 17. Then, the current source 21 passes current between the auxiliary electrodes 16 and 17 until an incremental change of, for example, 10 millivolts is obtained between the reference electrodes 14 and 18 as detected by the voltage comparator 22. At this time, the feedback circuit 26 carries a hold signal and clamps the current flow at a fixed value to thereby preserve the desired electrode potential. This function of the instrumentation 12 is employed through variations of the electrode arrangement in accordance with the novel technique of this invention.

Although there are a variety of possible connections to be employed, it is preferred that the electrodes 14, 16, 17, and 18 be arranged in the illustrated side-by-side arrangement in horizontal alignment within the electrolyte 15. This instrumentation 12 permits the measurement of conductivity of an electrolyte directly in mhos or more convenient values of millimhos irrespective of the electrodes initial polarization potential in various electrolytes and without being effected by fouling conditions. In other words, as long as any portion of the metallic electrodes are exposed to the electrolyte, the present system 11 functions. When the electrodes are completely destroyed by corrosion or other mechanisms or completely insulated from the electrolyte by a totally enclosing film of scale, then and only then will the measurement of conductivity by this d.c. technique degrade. The instrumentation 12 can monitor both corrosivity of the coolant according to the teachings of the mentioned U.S. Pat. No. 3,717,566 and it is also employed with the novel electrode arrangement 13 for the d.c. ionic measurement of conductivity of an electrolyte. In general, the instrumentation 12 is arranged so that approximately 1 microampere of current flow passing between the auxiliary electrodes 16 and 17 corresponds to a 10 millivolt polarization potential increment between the reference electrodes 14 and 18 when the electrolyte provides a conductivity measurement of about 1,000 micromhos.

The four metallic electrodes preferably have an elongated configuration and all reside in the same vertical plane in a side-by-side relationship. Although the electrodes may take any suitable form, they are preferably substantially identical cylindrical ferrous members. However, they need not be identical for purposes of the present invention. Identical cylindrical electrodes are preferred for purposes of construction. These electrodes are disposed symmetrically within the electrolyte 15. Naturally, these electrodes are mounted within electrical isolation relative to one another and from any metallic devices such as the container 27 in which resides the electrolyte 15.

Figure 2:
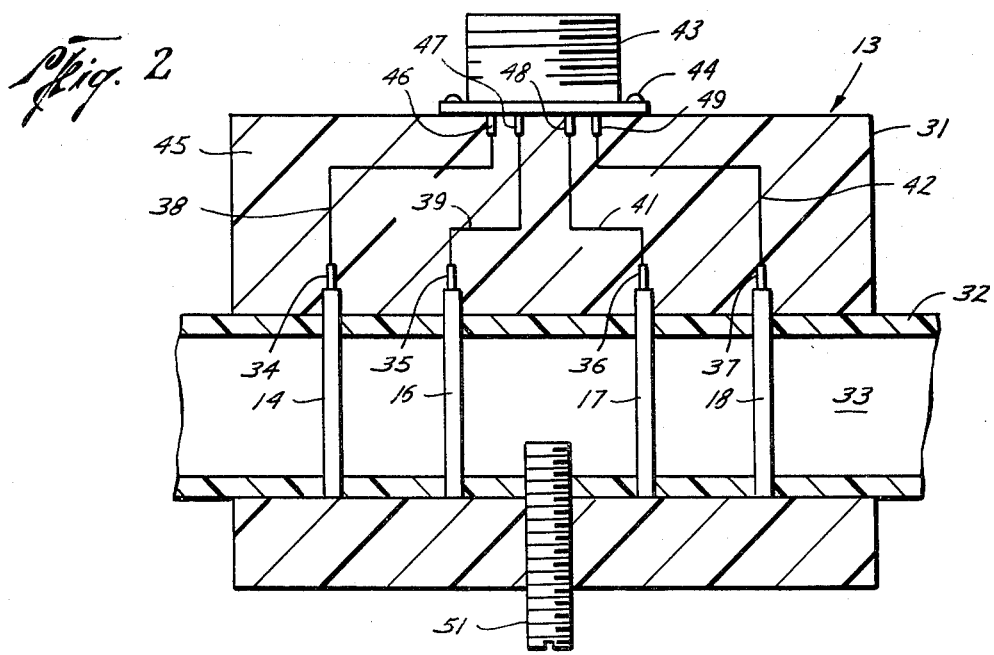
FIG. 2 is a vertical sectional view taken through a conductivity probe arranged according to the present invention having four electrodes contained in a "closed" cell for accurate measurements of conductivity of an electrolyte by the circuit shown in FIG. 1.

Referring now to FIG. 2, there is shown a preferred embodiment of the construction of the electrode arrangement 13. The arrangement 13 includes a rectangular body 31 mounting a tubular insulating member 32 forming a cylindrical passageway 33 in which the electrolyte is received in either flowing or static conditions. The member 32 is secured within the body 31 by an adhesive. For example, the member 32 and body 31 can be made of polyvinyl chloride plastic materials and a polyvinyl chloride cement for securing these parts into an integral fluid-tight structure. The metallic electrodes 14, 16, 17, and 18 (carrying like numerical designations to FIG. 1) are disposed transversely to the axis of the passageway 33. The electrodes can traverse both sidewalls of the tubular member 32, but they only need to extend transversely from one sidewall into the passageway 33 for purposes of the present invention. The upper extremities of the electrodes carry terminal pins 34, 35, 36, and 37, to which conductors 38, 39, 41, and 42 are secured. These conductors terminate at a multiple-connector, female electrical fitting 43 secured to the body 31 by screws 44. The electrical fitting 43 contains terminal pins 46, 47, 48, and 49, to which conductors 38, 39, 41, and 42, respectively, are connected. In this fashion, the electrical instrumentation 12 connects through the electrical fitting 43 to the electrodes 14, 16, 17, and 18 disposed within the passageway 33. The conductors R, A, T and T' connect with these terminal pins in electrical fitting 43. The body 31 carries an opening 45 filled with a cast potting material which is electrically insulative to the conductors and electrodes after assembly of the arrangement 13.

It may be desired in some instances to calibrate the arrangement 13 into some particular exact magnitude. For example, one milliampere of current between the auxiliary electrodes 16 and 17 with a 10 millivolt polarization potential increment between the reference electrodes 14 and 18 corresponds to 1,000 micromhos of conductivity in the electrolyte 15 within the passageway 33. For this purpose, a threaded plastic screw 51 is arranged within the body 31 to move transversely into the passageway 33 symmetrically between the electrodes 16 and 17. The plastic screw 51 moving into and out of the passageway varies the cross-sectional area of the passageway 33 between the auxiliary electrodes 16 and 17. Thus, movement of the screw 51 provides a first order change in calibration or the "cell constant" of the arrangement 13.

In the arrangement 13, the construction, diameter, exposed area, and other physical size parameters of the electrodes do not influence the operability of calibration cell constant except in a second order relationship. Since the passageway 33 is cylindrical and the electrodes are mounted therein symmetrically, the calibration cell constant for the arrangement 13 is substantially determined only in the first order by the spacing between the electrodes 16 and 17 and the cross-sectional area (in a transverse plane) of the passageway 33. The effect of the electrode size (diameter and length), corrosion attack and incomplete scale coverage of the electrodes are only third order effects. Thus, corrosion, pitting, and other physical changes in the electrodes do not effect the calibration cell constant.

The electrode arrangement 13 is of the closed cell type so that external influences do not interfere with the conductivity measurements being undertaken by the instrumentation 12. As is appreciated, the passageway 33 is circumferentially enclosed by insulating tubular member 32. Reference electrodes 14 and 18 are at practically infinite impedance relative to the auxiliary electrodes 16 and 17. Thus, current flows cannot pass beyond the outer electrode pair of reference electrodes 14 and 18 through the electrolyte 15. As a result, this structure in arrangement 13 delimits the electrodes into a well-defined flux channel beyond which current cannot flow through the electrolyte 15. A change in the cross-sectional area of the flow passageway 33 can only occur by deposition of solids. Usually such deposition is of uniform dimension throughout the circumference and length of the passageway 33. Thus, the influence upon the cross-sectional area is only a minute ratio factor in determining the cell constant. Thus, the arrangement 13 maintains a preset cell constant for practically any environmental use until the electrodes are completely destroyed by corrosion or other physical reduction into an inoperable size, namely, disappearance.

The determination of the calibration constant for the corrosion measurement probe of the present invention is determined by unique relationship of mathematical definition for the electrodes employed therein. More particularly, these electrodes are defined by the following relationship:

$$\Delta i = \Delta V \left(\frac{A}{d}\right) \frac{1}{\rho}$$

wherin $\Delta i$ is the current between the auxiliary electrodes, $\Delta v$ is the incremental change in polarization potential between the reference electrodes, $\rho$ is the resistivity of the electrolyte (e.g., water), $A$ is the cross-sectional area of the passageway 33, and $d$ is the distance between the auxiliary electrodes 16 and 17. Since $A$ and $d$ are fixed in relationship, then $$\Delta i = \Delta V \left(\frac{K}{\rho}\right)$$

wherein $K$ is the "cell" constant. Rewriting the equation for linear system $$\frac{\Delta i}{\Delta v} = \frac{K}{\rho} = K\sigma$$

wherein $\sigma$ is the conductivity of the electrolyte. Since $\Delta i$ and $\Delta v$ are readily measured, the conductivity is easily found, and $i = K'\sigma$ since $K'$ is the actual cell constant for an instrument that impresses a particular $\Delta v$ each time, for example, $\Delta v = 10$ mv.

The electrode arrangement 13 can be manufactured to an exactly precise calibration constant. However, the expense of such technique of manufacture need not be suffered. For this purpose, the screw 51 provides a very unique method of adjusting the calibration cell constant K' to a particular desired value. A precise calibration to a specific cell constant K' can be made with a particular external associated instrumentation 12. For example, in the equation
$i = K'\sigma$,
1 microampere can be made equivalent to a conductivity of 1,000 micromhos wherein K' = 0.001. For this purpose, the arrangement 13 is constructed with a cell constant K' which is smaller than the desired value. Then, the arrangment 13 is connected through the electrical fitting 43 to the external instrumentation 12. Current is passed through a known conductivity liquid (e.g., water) between the electrodes 16 and 17. The incremental change in electrode potential is measured through the electrodes 14 and 18. For example, the electrolyte 15 can be distilled and degassed water which has a known conductivity. The potential change induced (e.g., 10 millivolts) between the electrodes 14 and 18 is measured by the voltmeter 23. By the relatively simple earlier described calculation, the calibration cell constant K' for the probe assembly is determined.

Should the cell constant K' not be desired value for this particular instrumentation 12, the characteristics of the flux channel within the arrangement 13 are adjusted by screw 51 for the specific calibration constant K'.

The electrodes within the electrode arrangement 13 do not require cleaning unless they become completely coated with a scale or insulating deposit that covers their entire exposed surface. This coating must be sufficient to insulate them electrically from contact with the fluid to be measured before it becomes a problem. The cell constant K' is not affected by a reduction in electrode "contact" area with the electrolyte. The measurement is unaffected over a very wide range of flow rate providing it is reasonably constant during the measurement (plus or minus 50 per cent). Some variation may be detected, which is caused indirectly by the flow sensitive nature of the "chemical" ionic equilibrium of the measuring electrodes. This influence could be avoided through the use of specific types of thermodynamic reference and measuring electrodes at very considerable expense. However, the present novel technique avoids this expense. The elongated metallic electrodes of the present invention can be mild steel and provide a service-free lifetime of several years unless the corrosion rate of the electrolyte is very excessive. For monitoring very corrosive fluids in electrolytes, the mild steel electrodes still are a good material although the lifetime of the arrangement 13 may be diminished.

It will be noted that the novel technique herein described does not include any temperature compensation for the conductivity measurement. The instrumentation 12 as has been described does not include any temperature compensating circuitry. Naturally, the implied properties of conductivity measurement, although the conductivity of a given substance is temperature dependent, conductivity in units of micromhos per cubic centimeter is by unit definition not specific as to substance or temperature coefficient of substance conductivity. Therefore, temperature correction of conductivity was measured in micromhos is not applicable. When the conductivity is expressed in equivalent chemical substance concentration units, there is a necessity to apply empirically determined temperature compensation specific to the particular substance. It should be noted, however, that the conductivity is not always due to the substances referred to, wholly or in part, and therefore temperature compensation becomes a practical impossibility, particularly in those cases where strong acid is added for hydrogen ion control. Thus, the use of conductivity measurement is mainly for employment to relative scale of total dissolved solids or like measurement criteria. Thus, the use of conductivity in micromhos is more appropriate for determining the "scaling tendency" of an electrolyte since it is a direct measurement of the total contribution of ionic strength of the constitutents of the electrolyte at the temperature of measurement.

From the foregoing, there has been described herein an embodiment of the novel technique of the present invention in a d.c. system for the measurement of conductivity of an electrolyte. The system is immune to the usual problems of d.c. polarization potentials between reference electrodes and is substantially independent of the dimensions, corrosion attack, pitting, fouling of the electrodes, including other changes in their shape, size and surface areas, in the electrode arrangements employed for making the d.c. current conductivity measurements. The present system has all the advantages of both open and closed cell d.c. measurement system of conductivity and is not influenced by the deposition of scale other than would change the dimensions of the flow channel containing the electrodes.

Various modifications and alterations of the described probe will be apparent to those skilled in the art from the foregoing descriptions which do not depart from the spirit of the invention. For this reason, these changes are desired to be included within the scope of the present invention. The appended claims define the present invention; the foregoing description is to be employed for setting forth the present embodiments as illustrative in nature.

What is claimed is:

1. A d.c. system for measurement of conductivity of an electrolyte comprising:
   a. four metallic electrodes immersible in the electrolyte, said electrodes disposed in a side-by-side alignment forming exterior and interior electrode pairs, one of the exterior or interior electrodes serving as reference electrodes for monitoring said electrodes' polarization potential, and respectively, the other of the interior or exterior electrodes providing auxiliary electrodes for passing current through the electrolyte for creating the polarization potential;
   b. conductor means forming separate electrical circuits with said electrodes;
   c. current source means for passing a measurable amount of direct current between said auxiliary electrodes for inducing an incremental change of predetermined magnitude in electrode potential between said reference electrodes;
   d. potential measurement means connected to said reference electrodes for measurement of the incremental change in polarization potential therebetween;
   e. comparator means associated with said potential measurement means for controlling the current source means whereby a certain measurable amount of direct current passed between the auxiliary electrodes induces an incremental change of a predetermined magnitude between about 5 and 50 millivolts in electrode potential between said reference electrodes; and
   f. readout means sensing the direct current passed between said auxiliary electrodes whereby the certain measurable amount of direct current is proportional to the conductivity of the electrolyte.

2. The system of claim 1 wherein said incremental change is 10 millivolts.

3. The system of claim 1 wherein said electrodes are elongated metal rods of substantially identical dimensions.

4. The system of claim 1 wherein said exterior electrodes serve as reference electrodes and said interior electrodes provide auxiliary electrodes.

5. The system of claim 1 wherein said electrodes are elongated members oriented vertically in a plane, and each said reference electrode is spaced from the adjacent auxiliary electrode a distance not greater than the spacing between the auxiliary electrodes.

6. The system of claim 5 wherein the auxiliary electrodes are spaced apart a distance at least twice the distance between adjacent reference and auxiliary-electrodes.

7. The system of claim 6 wherein said electrodes are disposed within a cylindrical passageway formed in an insulator and positioned transversely to the longitudinal axis of said cylindrical passageway whereby said insulator provides a flux channel delimiting the current paths in the electrolyte residing between said electrodes.

8. The system of claim 7 wherein the electrodes confined in said flux channel are dimensioned to provide a 10 millivolt incremental change in polarization potential between said reference electrodes when 1 microampere of current passes between said auxiliary electrodes whereby the readout means reflects about 1,000 micromhos in conductivity in the electrolyte for each 1 microampere of current passed between said auxiliary electrodes.

9. The system of claim 8 wherein the distance between auxiliary electrodes and the cross-sectional area of the flux channel are dimensioned to provide the readout means with a calibration of 1,000 micromhos for each one microampere of current passed between said auxiliary electrodes.

* * * * *